April 14, 1959
M. E. BLAIS
2,882,464
TRANSISTOR ASSEMBLIES
Original Filed Dec. 4, 1952
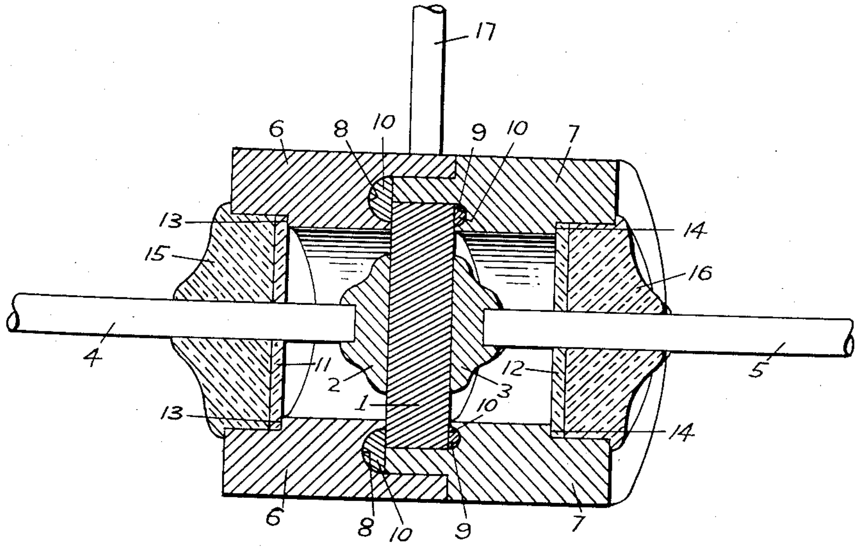
INVENTOR
MAURICE EDMOND BLAIS
BY Elmer J. Gorn
ATTORNEY United States Patent Office 2,882,464

Patented Apr. 14, 1959

2,882,464

TRANSISTOR ASSEMBLIES

Maurice Edmond Blais, Pawtucket, R.I., assignor to Raytheon Manufacturing Company, Newton, Mass., a corporation of Delaware Continuation of application Serial No. 324,094, December 4, 1952. This application May 1, 1956, Serial No. 581,960

7 Claims. (Cl. 317—235)

This application is a continuation of my prior copending application, Serial No. 324,094, filed December 4, 1952, now abandoned, and assigned to the same assignee as the present application.

This invention relates to a transistor assembly and the structure thereof.

In the production of transistors, compact packaging techniques readily adaptable to manufacturing methods have become an important consideration. One illustrative embodiment of this invention comprises a novel p-n-p type transistor structure of small size, which is easy to manufacture. This structure consists of two tubular sections of conducting material, such as nickel or iron, which, when joined, form a case to house the transistor components. Before these sections are joined, recesses in one rim of each of these sections are filled with an n-type material, such as antimony. A single-crystal body of semiconductor material, such as a disk of germanium, having two leads connected thereto with a p-type material, such as indium, is placed between the sections so that the recesses containing the n-type material are in contact with the rim of the disk. The semiconductor body and the two tubular sections are simultaneously joined by heating these components so that the n-type material melts into the semiconductor body to form a mechanical joint between the two sections and the germanium disk. The wire leads connected to the disk of germanium are insulated from the case by threading a mica button having a hole therein over each lead and pushing the buttons into inserts at both ends of the case. The entire case is then moisture-proofed by sealing the ends of the case with glass, plastic, or any suitable compound. If desirable, a lead may then be soldered to the case to complete the electrical connections necessary for operating the apparatus.

The invention and features thereof will be understood more clearly and fully from the following detailed description of one embodiment of the invention with reference to the accompanying drawing in which a cross-sectional view, on a greatly enlarged scale, of a p-n-p junction transistor assembly is shown.

Referring now to the apparatus illustrated in the drawing, semiconductor body 1 may be any single-crystal semiconductor material, such as germanium or silicon. For example, a disk of single-crystal germanium can be used successfully for the purposes of this invention. Two beads 2 and 3 of p-type material are connected to opposite sides of semiconductor body 1 by heating beads 2 and 3 until they melt into the body to form a junction with semiconductor body 1. The p-type beads 2 and 3 may be any p-type impurity, such as indium, gallium, boron, or aluminum, selected from elements of the third periodic group. For example, indium can be successfully soldered to the germanium disk to form a p-type junction. The semiconductor body 1 will thus have two p-type junctions; however, if it is desirable to assemble an n-p-n junction transistor, n-type beads instead of p-type beads can be joined to the semiconductor body 1.

Wire leads 4 and 5 are connected to semiconductor body 1 at the same time that beads 2 and 3 are joined to semiconductor body 1 by inserting leads 4 and 5 into the molten p-type beads. The semiconductor body 1, with leads 4 and 5 attached thereto, is joined to a two-sectional tubular case comprised of a first section 6 and a second section 7. This is accomplished by filling the recesses 8 and 9 in sections 6 and 7, respectively, with an n-type material 10. The two sections 6 and 7 of the case can be made of any suitable electrical conducting material, such as nickel or iron, for example. The n-type material 10 may be any n-type donor impurity, such as antimony, arsenic, or phosphorous, selected from elements of the fifth periodic group. For example, antimony has been used successfully for the purpose described above. The first section 6 and the second section 7 are interlocked with the semiconductor body 1 and leads 4 and 5, as shown in the figure, and the structure is heated until the n-type material 10 melts into the semiconductor body 1 to form a junction between sections 6 and 7 and semiconductor body 1. Thus, an n-type junction is formed around the rim of semiconductor body 1, and the sections 6 and 7 are simultaneously sealed together to form a tubular case. Though the necessary components for a p-n-p type junction transistor are shown, the p-type and n-type materials can be interchanged to form a n-p-n type junction transistor as well. It should be noted that where the term "donor impurity" is used, the term refers to an n-type element, as discussed above.

To complete the transistor assembly, buttons 11 and 12, having a single central hole, are threaded over the leads 4 and 5 and are pushed into the transistor case until they rest against insets 13 and 14. The buttons 11 and 12 are sized so that their diameters are only slightly smaller than the inner diameter of the transistor case, and the hole in each of these buttons should be just slightly larger in diameter than that of the wire leads 4 and 5. The buttons 11 and 12 may be made of mica or any other material which will insulate the leads 4 and 5 from the case and keep sealing materials from flowing into the case. Both ends of the transistor case are closed and moisture-proofed by melting sealing materials 15 and 16 around the leads 4 and 5 and onto the outer faces of buttons 11 and 12. The sealing materials 15 and 16 may be any glass, plastic, or other compound suitable for insulating leads 4 and 5 and moisture-proofing the case. Although the transistor case acts as a conductor to the n-type material 10, a wire lead 17 may be attached to the case by conventional means if such is desired.

It should be noted that n-type, p-type, or n-p type diodes can be assembled in the structure described above, just as the n-p-n type transistors or any combinations thereof could be made as well as the p-n-p type transistor illustrated. Therefore, where the term "transistor" is used, it also refers to n-type, p-type, and n-p type diodes, and is not limited to the more complex types of junction transistors.

Thus, it is to be understood that this invention is not limited to the particular details as described above, as many equivalents will suggest themselves to those skilled in the art. For example, the case need not be two-sectional, but could be a single section appropriately machined so that the semiconductor body 1 could slide into the case. Also, the case need not be tubular but could be cube shaped to hold a square or rectangular semiconductor body. As previously stated, the semiconductor body can be any single-crystal semiconductor material, such as silicon as well as germanium, and the p-type and n-type impurity elements may be changed and limited as desired. Likewise, the sealing and moisture-proofing compounds can be altered to suit the manufacturing techniques involved. Therefore, it is desired that the appended claims be given a broad interpretation commensurate with the scope of the invention within the art.

What is claimed is:

1. A transistor assembly comprising a body of semiconductor material joined by n-type material to a conducting case, leads connected by p-type material to spaced points on said body, and means to support said leads from said case.

2. A transistor assembly comprising a body of semiconductor material joined by p-type material to a conducting case, leads connected by n-type material to spaced points on said body, and means for insulating said leads and sealing said case.

3. A transistor assembly comprising two sections to form a conducting case, said sections each having recesses containing n-type material, a semiconductor body joined to said sections by said n-type material, and leads connected by p-type material to spaced points on said body.

4. A transistor assembly comprising two interlocking sections to form a conducting case, said sections each having recesses containing p-type material, a semiconductor body joined to said sections by said p-type material, leads connected by n-type material to spaced points on said body, means for insulating said leads from said case, means for sealing said case, and an additional lead connected to said case.

5. A transistor assembly comprising two tubular interlocking sections to form a conducting tubular case, said sections each having recesses on a rim thereof containing an n-type material, a disk of semiconductor material supported by said recesses and joined to said sections by said n-type material, leads connected by p-type material to opposite sides of said disk, means for insulating said leads and sealing said case, and an additional lead connected to said case.

6. A transistor assembly comprising a body of germanium joined by antimony to a conducting case, leads connected by indium to spaced points on said body, and means to support said leads from said case.

7. A transistor assembly comprising a body of semiconductor material joined by a first impurity material to a conducting case, leads connected by a second impurity material to spaced points on said body, and means to support said leads from said case.

References Cited in the file of this patent

UNITED STATES PATENTS

| | | |
|---|---|---|
| 2,644,852 | Dunlap | July 7, 1953 |
| 2,644,914 | Kircher | July 7, 1953 |
| 2,758,261 | Armstrong et al. | Aug. 7, 1956 |
| 2,759,133 | Mueller | Aug. 14, 1956 |
| 2,765,516 | Haegele | Oct. 9, 1956 |